United States Patent
Sato et al.

(10) Patent No.: US 11,008,024 B2
(45) Date of Patent: May 18, 2021

(54) RAILCAR FLEXIBLE GEAR COUPLING AND RAILCAR BOGIE INCLUDING SAME

(71) Applicants: KAWASAKI JUKOGYO KABUSHIKI KAISHA, Kobe (JP); KYUSHU HASEC CO., LTD., Nohgata (JP)

(72) Inventors: Yoshi Sato, Sanda (JP); Takehiro Nishimura, Kobe (JP); Susumu Hirata, Munakata (JP)

(73) Assignees: KAWASAKI JUKOGYO KABUSHIKI KAISHA, Kobe (JP); KYUSHU HASEC CO., LTD., Nohgata (JP)

( * ) Notice: Subject to any disclaimer, the term of this patent is extended or adjusted under 35 U.S.C. 154(b) by 0 days.

(21) Appl. No.: 16/313,535

(22) PCT Filed: Jun. 13, 2018

(86) PCT No.: PCT/JP2018/022610
§ 371 (c)(1),
(2) Date: Dec. 27, 2018

(87) PCT Pub. No.: WO2019/003924
PCT Pub. Date: Jan. 3, 2019

(65) Prior Publication Data
US 2020/0182344 A1 Jun. 11, 2020

(30) Foreign Application Priority Data
Jun. 29, 2017 (JP) .................................. 2017-126903

(51) Int. Cl.
*B61D 3/18* (2006.01)
*B61C 9/50* (2006.01)
(Continued)

(52) U.S. Cl.
CPC ................ *B61D 3/185* (2013.01); *B61C 9/50* (2013.01); *B61F 3/04* (2013.01); *B61F 5/38* (2013.01);
(Continued)

(58) Field of Classification Search
CPC ... F16D 3/18; F16D 3/185; B61C 9/38; Y10T 74/19972; Y10T 403/7035
(Continued)

(56) References Cited

U.S. PATENT DOCUMENTS 2,035,171 A    3/1936  Loewus
2,922,294 A *  1/1960  Wildhaber .............. F16D 3/185
                                                         464/158

(Continued)

FOREIGN PATENT DOCUMENTS

EP    1325832 A2    7/2003
JP    S58-72526 U   5/1983
(Continued)

OTHER PUBLICATIONS

Feb. 14, 2020 Search Report issued in European Patent Application No. 18815498.3.

*Primary Examiner* — Zachary L Kuhfuss
(74) *Attorney, Agent, or Firm* — Oliff PLC

(57) ABSTRACT

A flexible gear coupling includes two external gears and two internal gears meshing with the respective two external gears. A tooth root crowning radius of each external gear is smaller than a tooth tip crowning radius of the external gear. The external gear is formed such that a reference tooth height that is a tooth height at a tooth width direction middle position is smaller than an end tooth height that is a tooth height at a tooth width direction end position. A ratio of the end tooth height to the reference tooth height is set to 1.21
(Continued)

TOOTH WIDTH DIRECTION
AXIAL DIRECTION or more, and/or a ratio Rc/Rb of the tooth root crowning radius to the tooth tip crowning radius is set to 0.37 or less.

8 Claims, 10 Drawing Sheets

(51) Int. Cl.
  *B61F 3/04* (2006.01)
  *B61F 5/38* (2006.01)
  *F16H 1/10* (2006.01)
  *F16H 1/26* (2006.01)
  *F16H 55/08* (2006.01)

(52) U.S. Cl.
  CPC ............... *F16H 1/10* (2013.01); *F16H 1/26* (2013.01); *F16H 55/088* (2013.01); *Y10T 74/19972* (2015.01)

(58) Field of Classification Search
  USPC .......................................... 464/154, 158, 16
  See application file for complete search history.

(56) References Cited

U.S. PATENT DOCUMENTS

| | | | | |
|---|---|---|---|---|
| 2,927,510 A | * | 3/1960 | Wildhaber | F16D 3/185 |
| | | | | 409/12 |
| 3,243,973 A | * | 4/1966 | Kraeling | F16D 3/185 |
| | | | | 464/156 |
| 5,271,289 A | * | 12/1993 | Baxter, Jr. | F16H 55/08 |
| | | | | 29/893 |
| 6,093,106 A | * | 7/2000 | Shigeura | F16D 3/185 |
| | | | | 464/158 |
| 9,200,678 B2 | * | 12/2015 | Maeda | F16D 3/185 |
| 2020/0182344 A1 | * | 6/2020 | Sato | F16H 1/26 |

FOREIGN PATENT DOCUMENTS

| | | | | |
|---|---|---|---|---|
| JP | 2001-132765 A | | 5/2001 | |
| JP | 2002021871 A | * | 1/2002 | ............ F16D 3/185 |
| JP | 2004-211789 A | | 7/2004 | |
| JP | 2012-149762 A | | 8/2012 | |

* cited by examiner

100# RAILCAR FLEXIBLE GEAR COUPLING AND RAILCAR BOGIE INCLUDING SAME

TECHNICAL FIELD

The present invention relates to a flexible gear coupling applied to a bogie of a railcar and a railcar bogie including a flexible gear coupling.

BACKGROUND ART

A power transmission device configured to transmit torque generated by a power source to a wheelset is mounted on a railcar bogie. For example, as in PTL 1, the power transmission device includes a flexible gear coupling. The flexible gear coupling transmit torque from a driving shaft to a driven shaft while allowing relative displacement between the driving shaft and the driven shaft by inclination displacement of a meshing portion where internal teeth of a sleeve and an external teeth of a hub mesh with each other (i.e., by a change in an inclination angle of an axis of the hub with respect to an axis of the sleeve).

CITATION LIST

Patent Literature

PTL 1: Japanese Laid-Open Utility Model Application Publication No. 58-72526

SUMMARY OF INVENTION

Technical Problem

According to a parallel cardan driving bogie including the flexible gear coupling, axle springs of the bogie deflect when, for example, passengers get in and out, and this changes the height of a bogie frame. Therefore, a deviation (relative displacement) occurs between the height of a rotation axis of a traction motor and the height of a pinion axis of a gear unit. This deviation is absorbed by the inclination displacement between the axes of the flexible gear coupling. The limit of an allowable angle of the inclination displacement (hereinafter may be referred to as an "allowable relative displacement magnitude") is about 6°. Therefore, when a vertical spring constant of the axle spring is reduced for improving ride quality, there is a problem that vertical deflection of the axle spring increases, and the inclination displacement exceeds the limit of the allowable angle of the flexible gear coupling.

Further, according to a steering bogie, since an axle is displaced in a yawing direction during steering, relative displacement occurs between the rotation axis of the traction motor and the pinion axis of the gear unit. Therefore, according to a parallel cardan steering bogie, since the relative displacement by the steering occurs in addition to the vertical deflection of the axle spring, the inclination displacement significantly exceeds the allowable relative displacement magnitude. As above, there is a problem that it is difficult to add a steering function to the parallel cardan driving bogie.

An object of the present invention is to provide a railcar flexible gear coupling having large allowable relative displacement magnitude.

Solution to Problem

A railcar flexible gear coupling according to one aspect of the present invention includes: two external gears; and two internal gears meshing with the respective two external gears, wherein: when viewed from a tooth thickness direction, a tooth tip of each of the external gears is formed in such a circular-arc shape having a tooth tip crowning radius that a distance from a center axis to the tooth tip is longest at a tooth width direction middle, and the distance from the center axis to the tooth tip is shortest at each of both tooth width direction ends; when viewed from the tooth thickness direction, a tooth root of each of the external gears is formed in such a circular-arc shape having a tooth root crowning radius that a distance from the center axis to the tooth root is longest at the tooth width direction middle, and the distance from the center axis to the tooth root is shortest at each of the tooth width direction ends; the tooth root crowning radius is smaller than the tooth tip crowning radius; each of the external gears is formed such that a reference tooth height that is a tooth height at a tooth width direction middle position is smaller than an end tooth height that is a tooth height at a tooth width direction end position; and a ratio of the end tooth height to the reference tooth height is set to 1.21 or more.

A railcar flexible gear coupling according to another aspect of the present invention includes: two external gears; and two internal gears meshing with the respective two external gears, wherein: when viewed from a tooth thickness direction, a tooth tip of each of the external gears is formed in such a circular-arc shape having a tooth tip crowning radius that a distance from a center axis to the tooth tip is longest at a tooth width direction middle, and the distance from the center axis to the tooth tip is shortest at each of both tooth width direction ends; when viewed from the tooth thickness direction, a tooth root of each of the external gears is formed in such a circular-arc shape having a tooth root crowning radius that a distance from the center axis to the tooth root is longest at the tooth width direction middle, and the distance from the center axis to the tooth root is shortest at each of the tooth width direction ends; the tooth root crowning radius is smaller than the tooth tip crowning radius; a tooth height of the external gear increases in a direction from the tooth width direction middle to each of the tooth width direction ends; and a ratio Rc/Rb of the tooth root crowning radius to the tooth tip crowning radius is set to 0.37 or less.

According to the above configuration, by forming the tooth tip of the external gear in a circular-arc shape when viewed from the tooth thickness direction, the axis of the external gear can be inclined relative to the axis of the internal gear. In order to make the reference tooth height smaller than the end tooth height, the ratio of the end tooth height to the reference tooth height is set to 1.21 or more, and/or the ratio of the tooth root crowning radius to the tooth tip crowning radius is set to 0.37 or less. With this, an allowable value (hereinafter referred to as an "allowable inclination angle") of an inclination angle of the axis of the external gear relative to the axis of the internal gear can be set to more than 6°. Since the allowable inclination angle increases, relative displacement magnitude allowed between two shafts can be increased.

A railcar bogie according to yet another aspect of the present invention includes: a bogie frame supporting a carbody; a wheelset including an axle and wheels provided at both respective ends of the axle; a traction motor provided at the bogie frame and including an output shaft extending in parallel with the axle; a gear unit configured to transmit rotation to the axle; and the railcar flexible gear coupling according to any one of claims 1 to 5, provided between the traction motor and the gear unit.

Advantageous Effects of Invention

The present invention can provide a railcar flexible gear coupling having large allowable relative displacement magnitude.

BRIEF DESCRIPTION OF DRAWINGS

FIG. 5A is an axial sectional view of the flexible gear coupling. FIG. 5B is a partial side view of the flexible gear coupling. FIG. 5C is a schematic diagram showing the positions and postures of external teeth relative to internal teeth.

DESCRIPTION OF EMBODIMENTS

Figure 1:
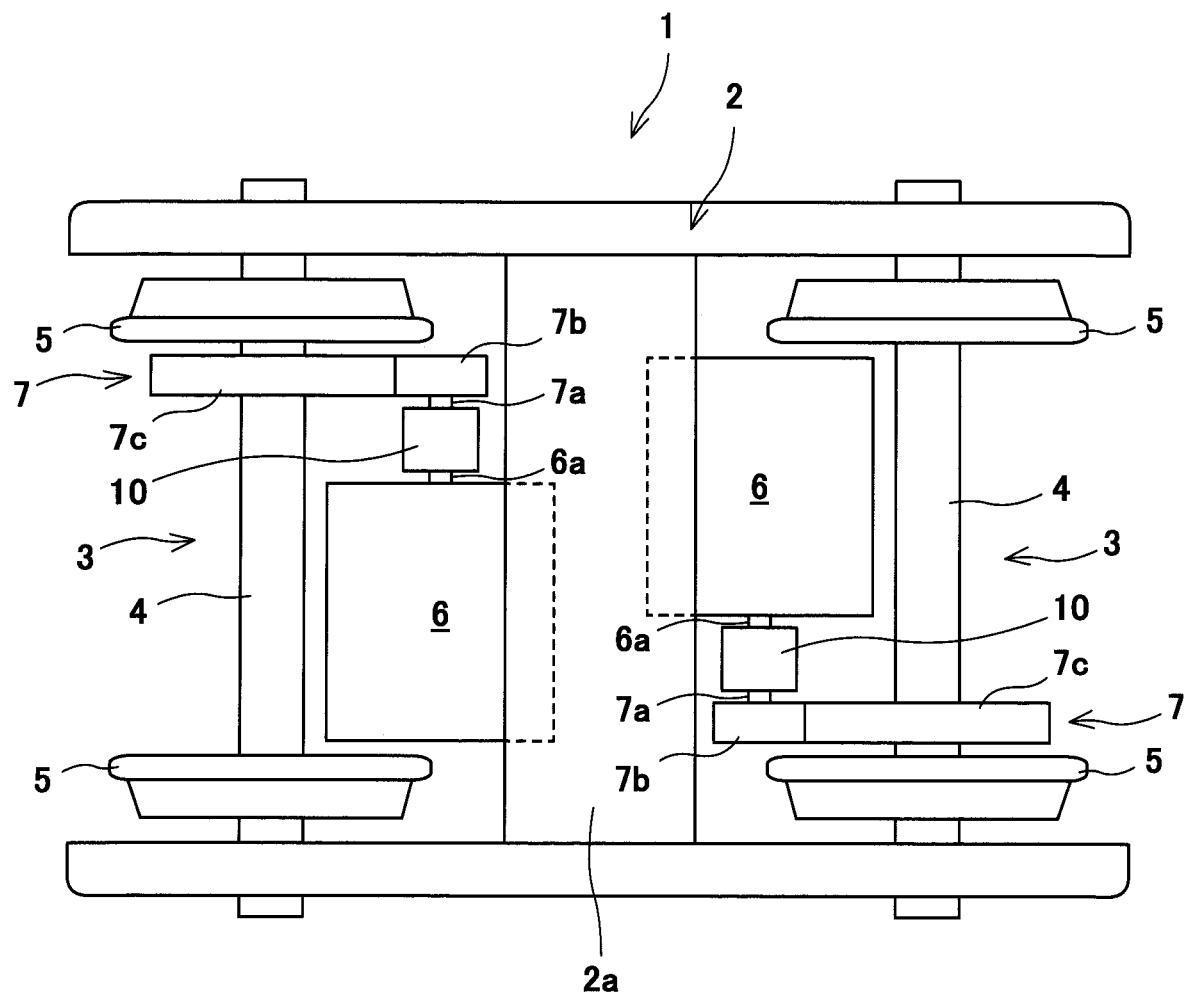
FIG. 1 is a plan view of a railcar bogie to which a flexible gear coupling according to an embodiment is applied.

Hereinafter, an embodiment will be explained with reference to the drawings. In the drawings, the same reference signs are used for the same or corresponding components, and a repetition of the same detailed explanation is avoided.

Bogie

FIG. 1 is a plan view of a parallel cardan driving bogie 1 (hereinafter simply referred to as a "bogie") of a railcar to which a flexible gear coupling 10 according to the embodiment is applied. The bogie 1 includes a bogie frame 2 supporting a carbody (not shown) from below. In the illustrative bogie 1, two wheelsets 3 are arranged away from each other in a car longitudinal direction and elastically supported by the bogie frame 2 through axle box suspensions (not shown). Each of the wheelsets 3 includes: an axle 4 extending in a car width direction; and a pair of wheels 5 provided at both respective ends of the axle 4. Two traction motors 6 configured to rotate the respective two wheelsets 3 are provided at the bogie frame 2 (for example, at a cross beam 2a of the bogie frame 2). An output shaft 6a of each traction motor 6 extends in parallel with the axle 4 and is coupled to an input shaft 7a of a gear unit 7 through the flexible gear coupling 10. The gear unit 7 is constituted by a parallel-shaft gear pair, and the input shaft 7a extends in parallel with the axle 4. The flexible gear coupling 10 is arranged between the traction motor 6 and the gear unit 7. The gear unit 7 transmits rotation to the axle 4. The gear unit 7 includes: a pinion 7b fixed to the input shaft 7a; and a gear 7c which meshes with the pinion 7b and is fixed to the axle 4. Torque generated by the traction motor 6 is transmitted to the corresponding wheelset 3 through the flexible gear coupling 10 and the gear unit 7.

The axle box suspensions serve as primary suspensions of the bogie 1. The traction motor 6 is fixed to the bogie frame 2 located above springs, and the gear unit 7 is fixed to the wheelset 3 located under the springs. The output shaft 6a may be displaced relative to the input shaft 7a in accordance with deflection of the axle box suspensions. The flexible gear coupling 10 transmits torque from the output shaft 6a to the input shaft 7a while allowing such relative displacement. The "relative displacement" includes axial displacement, parallel displacement (radial displacement), and angular displacement.

Flexible Gear Coupling

Figure 2:
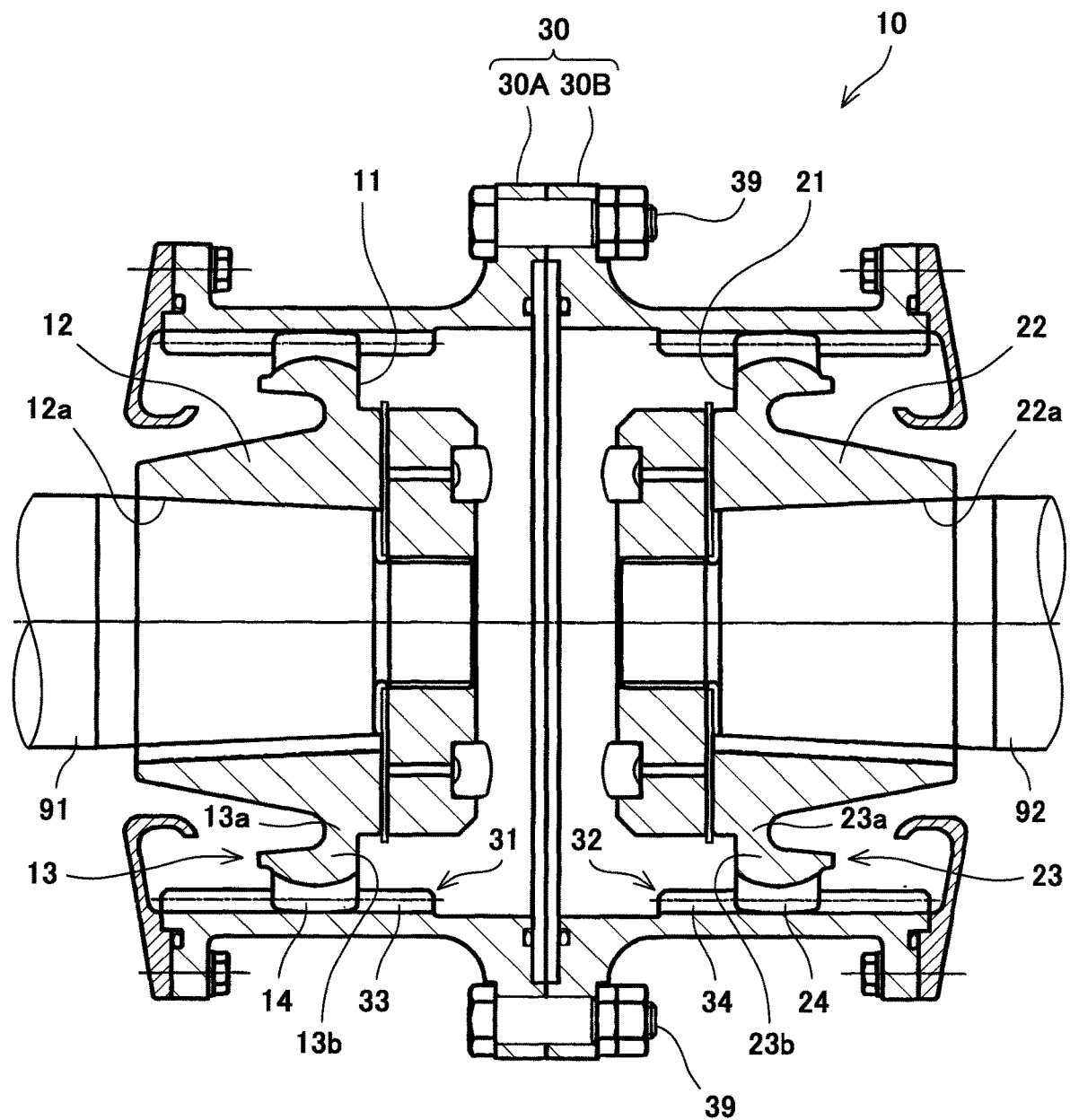
FIG. 2 is an axial sectional view of the flexible gear coupling according to the embodiment.

FIG. 2 is an axial sectional view showing the flexible gear coupling 10. The flexible gear coupling 10 includes a driving hub 11, a driven hub 21, and a sleeve 30. A driving shaft 91 (in the example of FIG. 1, the output shaft 6a of the traction motor 6) is fixed to the driving hub 11, and a driven shaft 92 (in the example of FIG. 1, the input shaft 7a of the gear unit 7) is fixed to the driven hub 21.

The driving hub 11 includes: a cylindrical portion 12 formed in a cylindrical shape; and an external gear 13 provided at an outer peripheral surface of the cylindrical portion 12. The external gear 13 includes a projecting portion 13a, a root portion 13b, and a plurality of external teeth 14. The projecting portion 13a projects from the cylindrical portion 12 outward in a radial direction. The root portion 13b projects from the projecting portion 13a outward in an axial direction and is formed in a ring shape surrounding the cylindrical portion 12. The plurality of external teeth 14 project from the root portion 13b outward in the radial direction. The plurality of external teeth 14 are arranged at regular intervals in a circumferential direction of the root portion 13b. As with the driving hub 11, the driven hub 21 includes a cylindrical portion 22 and an external gear 23. As with the external gear 13, the external gear 23 includes a projecting portion 23a, a root portion 23b, and a plurality of external teeth 24.

The sleeve 30 is formed in a cylindrical shape and includes openings at both respective axial ends. Two internal gears 31 and 32 are provided at an inner peripheral surface of the sleeve 30 so as to be located away from each other in the axial direction. The internal gear 31 includes a plurality of internal teeth 33 projecting from the inner peripheral surface of the sleeve 30. The plurality of internal teeth 33 are arranged at regular intervals in the circumferential direction of the sleeve 30. As with the internal gear 31, the internal gear 32 includes a plurality of internal teeth 34. The number of external teeth 14 and the number of internal teeth 33 are equal to each other, and the number of external teeth 24 and the number of internal teeth 34 are equal to each other.

The driving hub 11 is accommodated in one axial side of the sleeve 30, and the external gear 13 meshes with the internal gear 31. The driven hub 21 is accommodated in the other axial side of the sleeve 30, and the external gear 23 meshes with the internal gear 32. As above, the flexible gear coupling 10 includes the two external gears 13 and 23 and the two internal gears 31 and 32 which mesh with the two external gears 13 and 23, respectively.

In consideration of the ease of assembly, the sleeve 30 includes: a first divided body 30A constituting one axial half portion; and a second divided body 30B constituting the other axial half portion. The sleeve 30 is configured by arranging the two divided bodies 30A and 30B face to face in the axial direction and coupling the two divided bodies 30A and 30B to each other with a plurality of reamer bolts 39. The first divided body 30A includes the internal gear 31 and accommodates the driving hub 11. The second divided body 30B includes the internal gear 32 and accommodates the driven hub 21.

The cylindrical portion 12 includes a shaft insertion hole 12a at a center portion thereof. The shaft insertion hole 12a is open at an axially outer end surface and extends in the axial direction. A tip end of the driving shaft 91 is inserted into the shaft insertion hole 12a. The driving shaft 91 is coupled to the driving hub 11 (and the external gear 13) by using a fastening member, such as a screw, a spline, and/or a key, with the tip end thereof inserted into the shaft insertion hole 12a. As with the cylindrical portion 12, the cylindrical portion 22 includes a shaft insertion hole 22a. As with the driving shaft 91, the driven shaft 92 is inserted into the shaft insertion hole 22a and coupled to the driven hub 21 (and the external gear 23).

When the driving shaft 91 rotates, the driving hub 11 rotates integrally with the driving shaft 91. The rotation of the driving hub 11 is transmitted to the sleeve 30 through a contact portion where the external gear 13 and the internal gear 31 contact each other. The rotation of the sleeve 30 is transmitted to the driven hub 21 through a contact portion where the internal gear 32 and the external gear 23 contact each other. With this, the driven shaft 92 rotates integrally with the driven hub 21.

Figure 3:
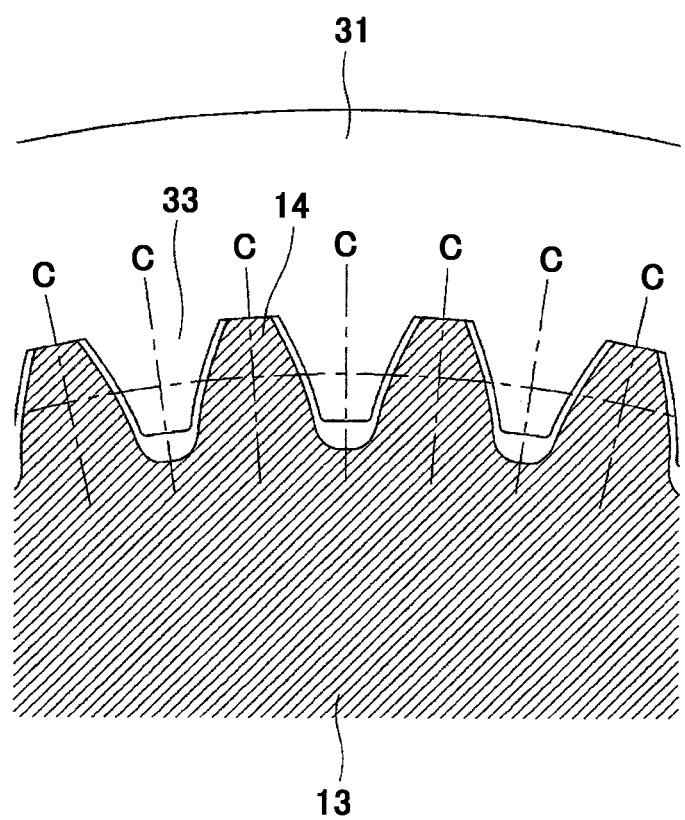
FIG. 3 is a radial sectional view of an external gear and an internal gear according to the embodiment.

FIG. 3 is a radial sectional view of the external gear 13 and the internal gear 31. Each of the external teeth 14 and the internal teeth 33 has a sectional shape that is line-symmetrical about a corresponding tooth thickness direction center line C. Adopted as a basic sectional tooth profile of each of the external gear 13 and the internal gear 31 is an involute tooth profile having a teeth number (hereinafter referred to as a "tooth profile teeth number N") larger than a teeth number (hereinafter referred to as an "actual teeth number NO") of each of the external teeth 14 and the internal teeth 33. In order to obtain a shape that exceeds tolerance required when manufacturing an involute shape having the actual teeth number NO, the tooth profile teeth number N is set to a value adequately larger than the actual teeth number NO. As one example, the tooth profile teeth number N is set to a value larger than the actual teeth number NO by 25% or more. The tooth profile teeth number N may be set to be infinite. In this case, the basic sectional tooth profile is an isosceles trapezoid. Although not shown in detail, the basic sectional tooth profile of each of the external teeth 24 of the external gear 23 and the internal teeth 34 of the internal gear 32 is also formed in the same manner as above.

Figure 4:
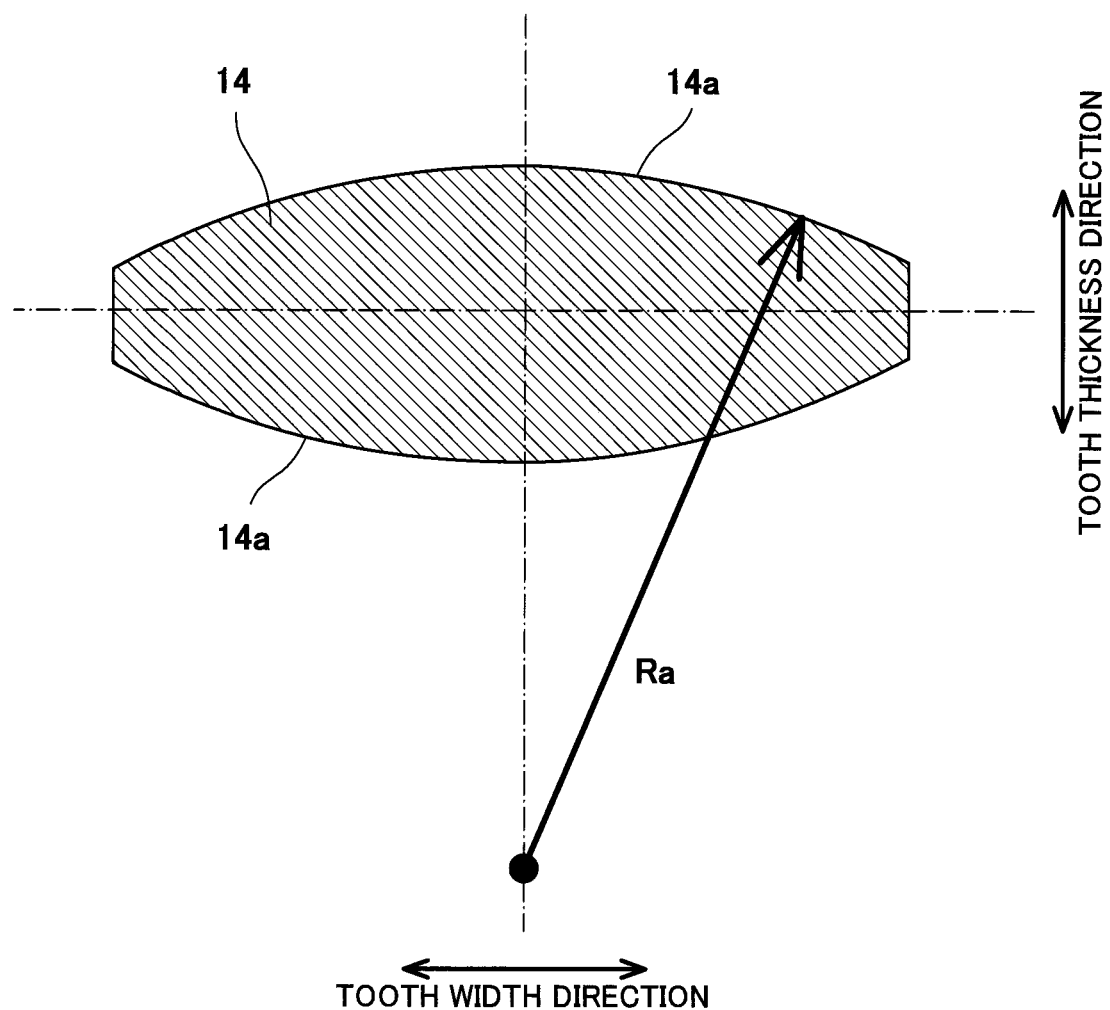
FIG. 4 is a sectional view of an external tooth, the sectional view being perpendicular to a radial direction.

FIG. 4 is a sectional view of the external gear 13 (especially, one external tooth 14), the sectional view being perpendicular to the radial direction. As shown in FIG. 4, the external tooth 14 includes two tooth surfaces 14a. In the present embodiment, a circular-arc bulge (so-called "tooth surface crowning") is formed at each of the two tooth surfaces 14a, and each of these tooth surfaces 14a is formed in a circular-arc shape in the sectional view perpendicular to the radial direction. Hereinafter, a radius of the circular-arc shape is referred to as a "tooth surface crowning radius Ra." In the sectional view perpendicular to the radial direction of the external tooth 14, the center of the circular-arc shape is located on a tooth width direction center line. Since the tooth surface crowning is formed at each of both surfaces of the external tooth 14, the thickness of the external tooth 14 is the largest at a tooth width direction middle position and the smallest at a tooth width direction end position. In the sectional view perpendicular to the radial direction, each tooth surface 14a is formed line-symmetrically about the tooth width direction center line, and the two tooth surfaces 14a are formed line-symmetrically about a tooth thickness direction center line.

A diameter of a tooth tip of the external gear 13 is set to be substantially equal to (slightly smaller than) a diameter of a tooth root of the internal gear 31. With this, misalignment of the driving hub 11 with respect to the sleeve 30 does not occur, and therefore, vibrations and noises generated by the vibrations can be reduced.

Figure 5:
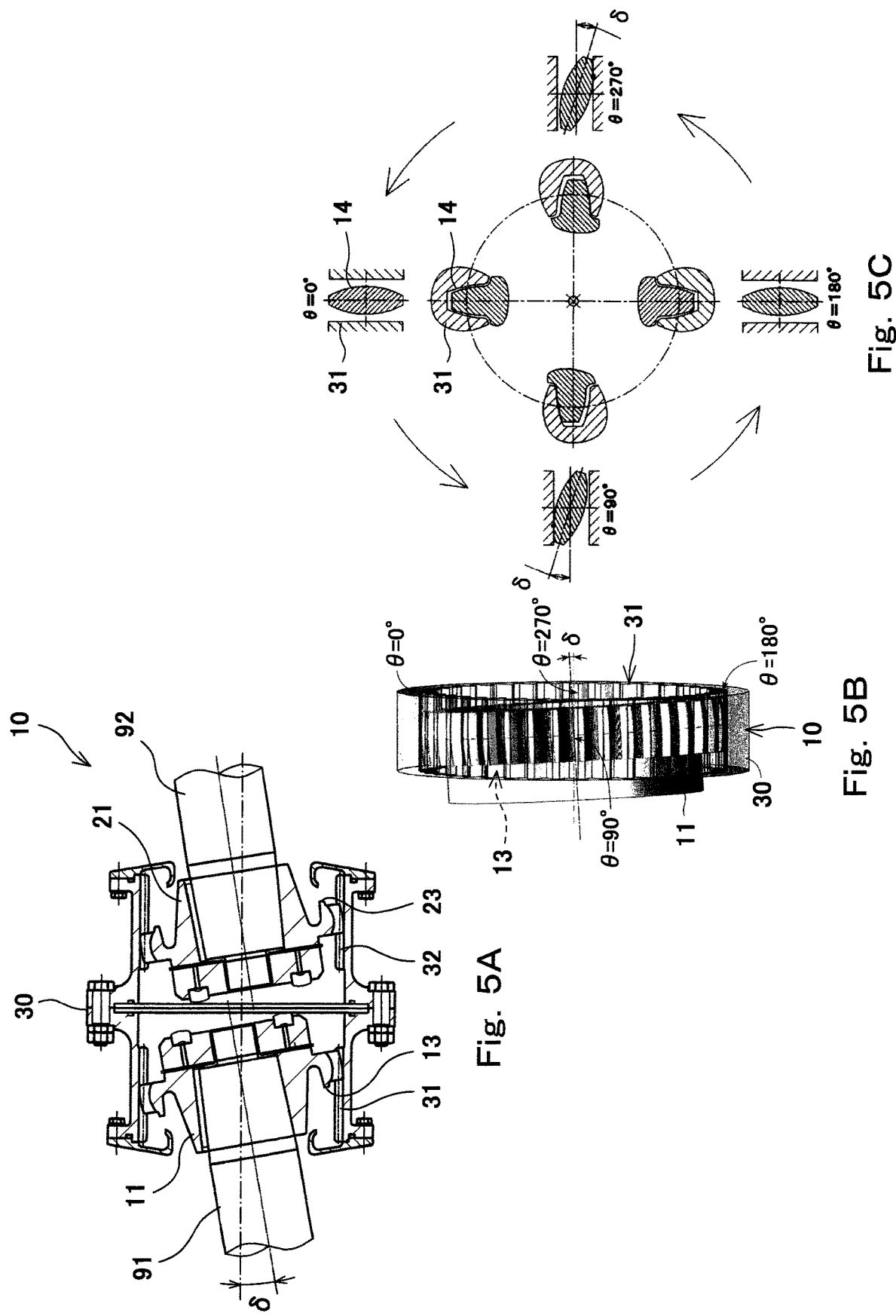
FIGS. 5A-5C show a state where the flexible gear coupling allows displacement of a driving shaft relative to a driven shaft.

FIGS. 5A-5C show a state where the flexible gear coupling 10 allows displacement of the driving shaft 91 relative to the driven shaft 92. As shown in FIG. 5A, the displacement of the driving shaft 91 relative to the driven shaft 92 is allowed by the inclination of the driving hub 11 and/or the inclination of the driven hub 21 relative to the sleeve 30. The degree of the inclination is shown by an inclination angle $\delta$ of a center line of the driving hub 11 or a center line of the driven hub 21 with respect to a center line of the sleeve 30.

FIGS. 5B and 5C show the inclination of the driving hub 11 relative to the sleeve 30. As shown in FIGS. 5B and 5C, when the driving hub 11 is inclined relative to the sleeve 30, the external teeth 14 contact the internal teeth 33 at two positions that are away from each other by 180° (in the illustrated example, two positions at the angles of 90° and 270°). With this, power transmission between the hub and the sleeve is realized. According to the external tooth 14 and the internal tooth 33 contacting each other, a tooth width direction of the external tooth 14 is inclined relative to a tooth width direction of the internal tooth 33 by the inclination angle $\delta$. With this, the internal tooth 33 contacts a portion of the tooth surface of the external tooth 14 which portion is an intermediate portion located between a center of the external tooth 14 and an end of the external tooth 14 in the tooth width direction.

As the inclination angle $\delta$ increases, relative displacement magnitude between the shafts increases. In other words, in order to increase the relative displacement magnitude allowed by the flexible gear coupling 10, an allowable value (hereinafter referred to as an "allowable inclination angle $\delta M$" (see FIG. 6)) of the inclination angle $\delta$ is required to be increased.

Figure 6:
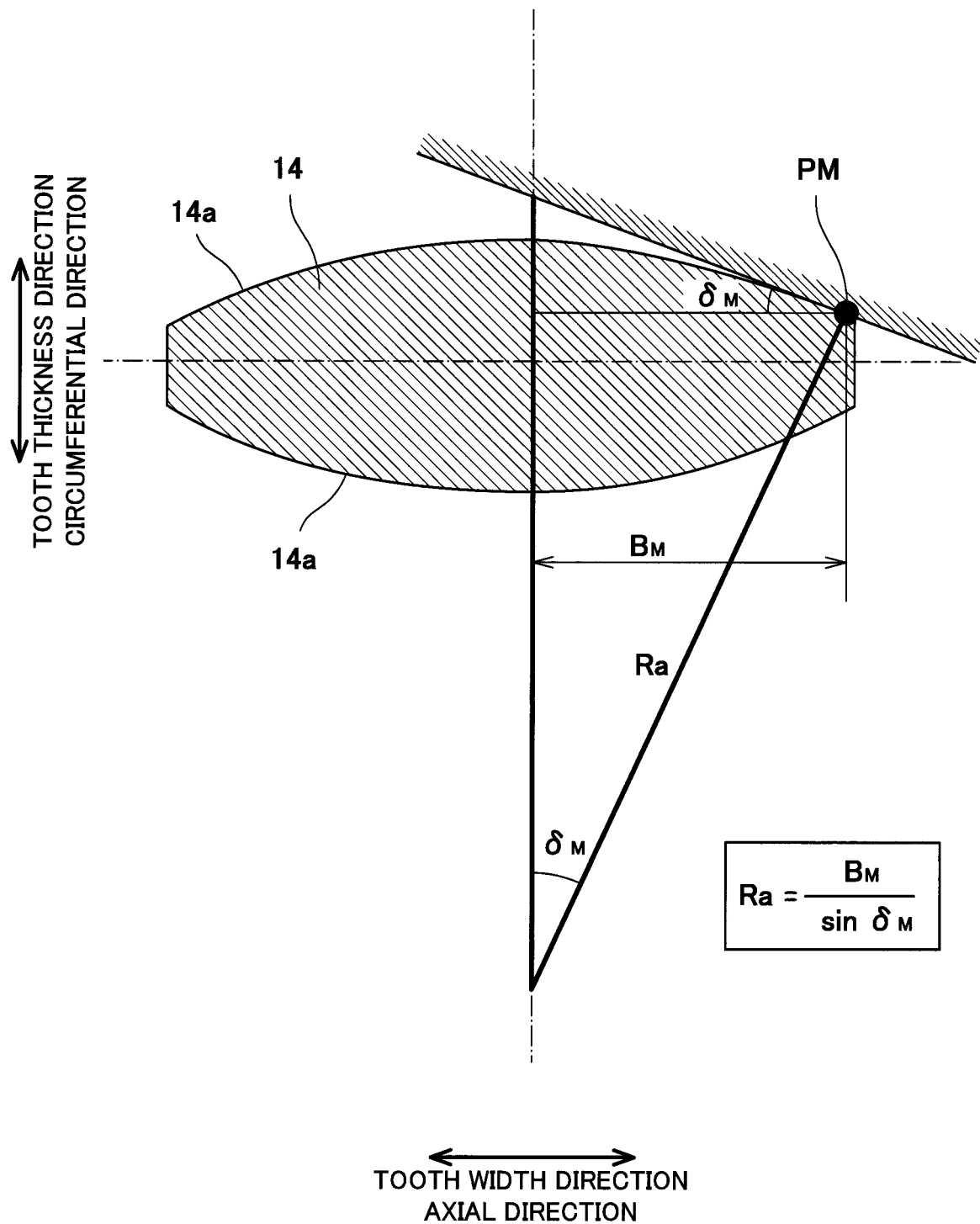
FIG. 6 is a sectional view of the external tooth and the internal tooth, the sectional view being perpendicular to the radial direction, and is an explanatory diagram of a tooth surface crowning radius Ra and an allowable inclination angle δM.

FIG. 6 is a sectional view of the external tooth 14 of the external gear 13 and the internal tooth 33 of the internal gear 31, the sectional view being perpendicular to the radial direction. In FIG. 6, the driving hub 11 is inclined relative to the sleeve 30 by the allowable inclination angle $\delta M$. Hereinafter, a portion of the tooth surface 14a of the external tooth 14 which portion contacts the internal tooth 33 in this case is referred to as a "limit contact portion PM." Setting the limit contact portion PM at a tooth width end is unrealistic. The limit contact portion PM is set at a position located slightly away from the tooth width end toward a tooth width middle portion (by about 1 mm, for example).

The allowable inclination angle $\delta M$ is an angle formed between a straight line passing through the center of the circular-arc shape of the tooth surface 14a and the limit contact portion PM and a straight line passing through the center of the circular-arc shape of the tooth surface 14a and extending in a tooth thickness direction of the external tooth 14. When the driving hub 11 is inclined relative to the sleeve 30 by more than the allowable inclination angle δM, no external teeth 14 contact the internal teeth 33, and therefore, power transmission is not realized. A distance from the center of the circular-arc shape of the tooth surface 14a to the limit contact portion PM is the tooth surface crowning radius Ra. In a section perpendicular to the radial direction, the tooth thickness direction is perpendicular to the tooth width direction.

Thus, the tooth surface crowning radius Ra, a distance BM from a tooth width direction middle to the limit contact portion PM, and the allowable inclination angle δM satisfy a formula "Ra=BM/sin δM." In order to increase the allowable inclination angle δM, it is necessary to reduce the tooth surface crowning radius Ra and/or increase the distance BM. In order to increase the distance BM, the increase in the tooth width of the external tooth 14 is necessary. However, due to design constraints of the bogie 1 to which the flexible gear coupling 10 is applied, the increase in the tooth width has a limit. In the present embodiment, in consideration of the application to the bogie 1, the tooth width is suppressed to 24 mm or less.

Figure 7:
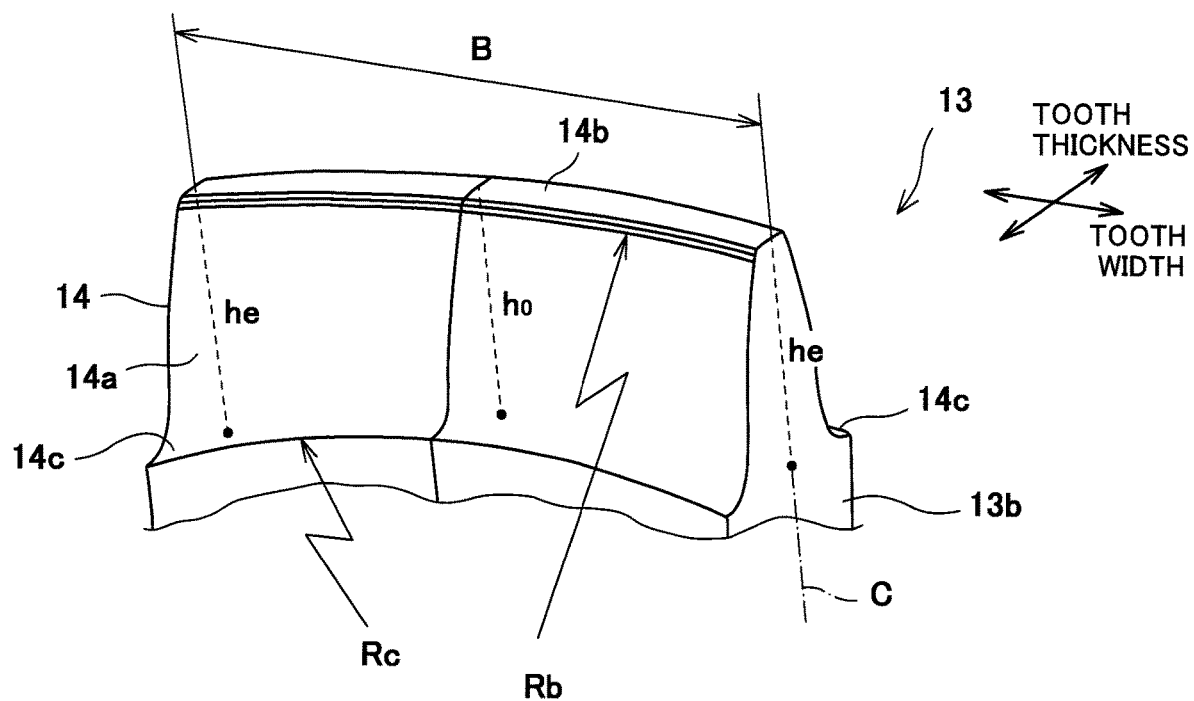
FIG. 7 is a perspective view of the external gear.

FIG. 7 is a perspective view of the external gear 13. Herein, the "tooth width B" denotes a tooth width direction distance from one tooth width direction end of the external tooth 14 to the other tooth width direction end of the external tooth 14. As one example, a tooth trace of the external tooth 14 is a straight tooth as one example, and the tooth width direction coincides with the axial direction. A "tooth height hi" denotes a distance from the tooth tip 14b to the tooth root 14c on the tooth thickness direction center line C at an arbitrary position in the tooth width direction.

When viewed from the tooth thickness direction, each of the tooth tip 14b and tooth root 14c of the external tooth 14 has such a circular-arc shape that: a distance from a center axis is the longest at a tooth width direction middle; and the distance from the center axis is the shortest at each of both tooth width direction ends. Hereinafter, a radius of the circular-arc shape of the tooth tip 14b is referred to as a "tooth tip crowning radius Rb," and a radius of the circular-arc shape of the tooth root 14c is referred to as a "tooth root crowning radius Rc."

When viewed from the tooth width direction, the tooth tip 14b of the external tooth 14 has such a circular-arc shape having the tooth tip crowning radius Rb that: the distance from the center axis is the longest at a tooth thickness direction middle; and the distance from the center axis is the shortest at each of both tooth thickness direction ends. To be specific, the tooth tip 14b of the external tooth 14 forms a spherical surface.

When viewed from the tooth thickness direction, each of the circular-arc shape of the tooth tip 14b and the circular-arc shape of the tooth root 14c is line-symmetrical about a tooth width direction center line passing through the tooth width direction middle and the center axis. Therefore, the tooth height at an arbitrary position in the tooth width direction becomes equal to the tooth height at a line-symmetrical position located away from the tooth width direction center line C by the same distance as the arbitrary position. Hereinafter, the tooth height at the tooth width direction middle position is referred to as a "reference tooth height h0," and the tooth height at the tooth width direction end position is referred to as an "end tooth height he."

Figure 8:
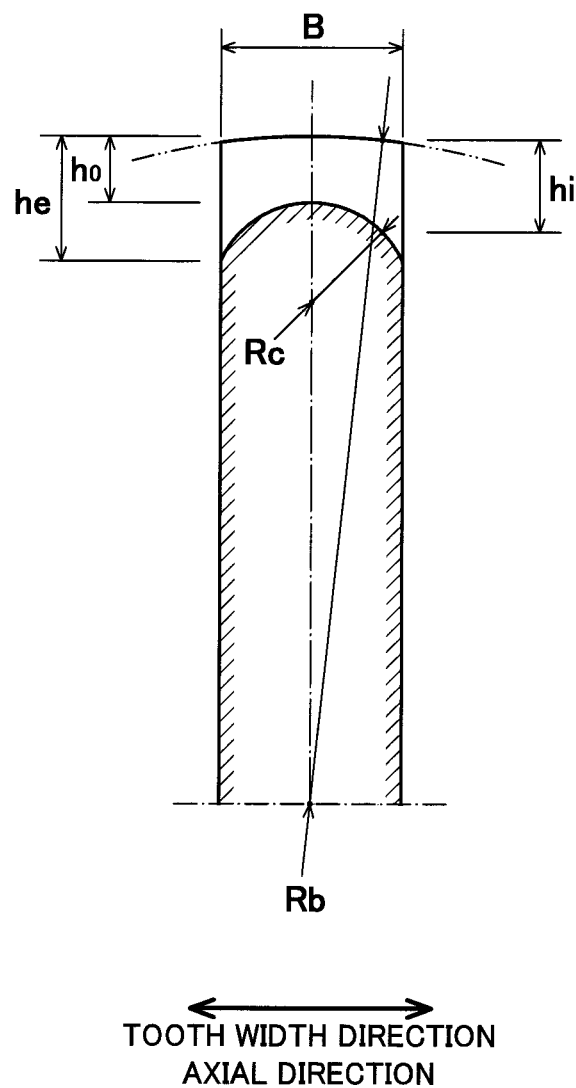
FIG. 8 is an axial sectional view of the external gear and an explanatory diagram of a tooth tip crowning radius Rb, a tooth root crowning radius Rc, a reference tooth height h0, and an end tooth height he.

FIG. 8 is an axial sectional view of the external gear 13. The tooth root crowning radius Rc is smaller than the tooth tip crowning radius Rb. It should be noted that even when the circular-arc shape of the tooth tip 14b and the circular-arc shape of the tooth root 14c are concentric with each other, a dimensional relation between the radius Rb and the radius Rc becomes the above relation. In the present embodiment, the center of the circular-arc shape (spherical surface) of the tooth tip 14b is located on the center axis. On the other hand, although the center of the circular-arc shape of the tooth root 14c is located on the tooth width direction center line when viewed from the tooth thickness direction, it is positioned closer to the external tooth 14 than the center axis.

Since the circular-arc shape of the tooth tip 14b and the circular-arc shape of the tooth root 14c are set as above, the tooth height hi varies depending on positions in the tooth width direction. The reference tooth height h0 is smaller than the end tooth height he. In addition, the tooth height hi is the smallest at the tooth width direction middle position, increases in a direction away from the tooth width direction middle position along the tooth width direction, and is the largest at the tooth width direction end position. The reference tooth height h0 is a minimum value of the tooth height hi that varies depending on positions in the tooth width direction, and the end tooth height he is a maximum value of the tooth height hi.

Figure 9:
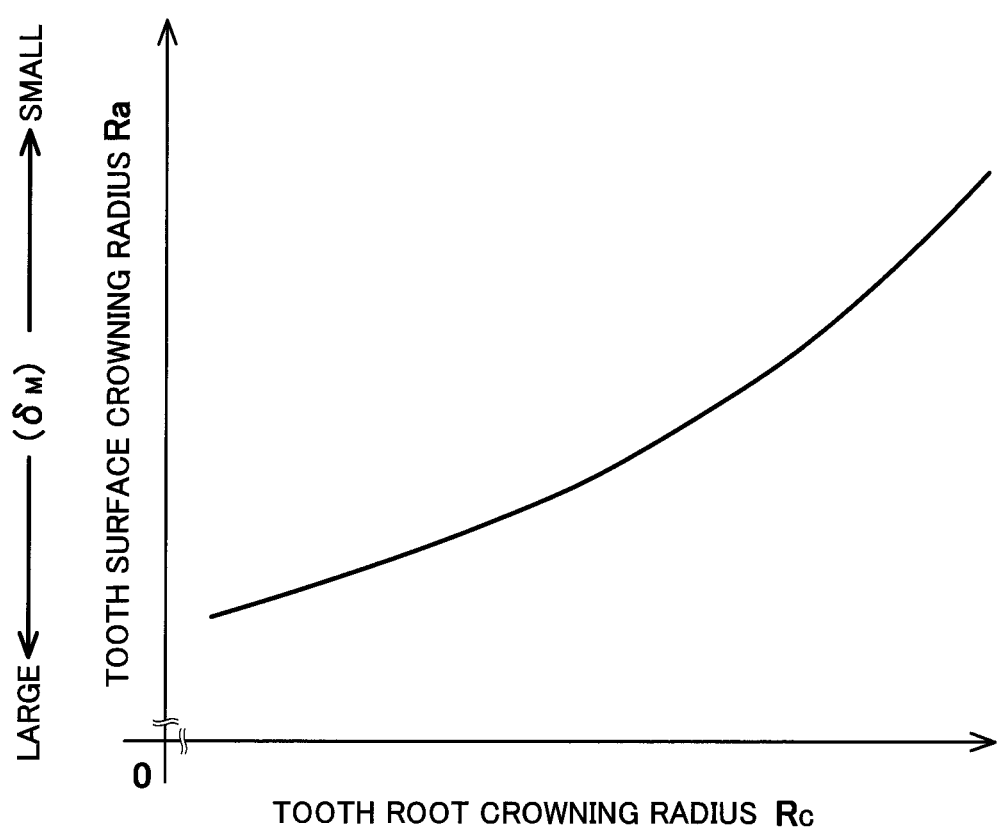
FIG. 9 is a graph showing a relation between the tooth root crowning radius Rc and the tooth surface crowning radius Ra and a relation between the tooth root crowning radius Rc and the allowable inclination angle δM.

FIG. 9 is a graph showing a relation between the tooth surface crowning radius Ra and the tooth root crowning radius Rc. As described above, since the tooth surface crowning radius Ra is inversely proportional to a sine (sin δM) of the allowable inclination angle δM, the graph indirectly shows a relation between the allowable inclination angle δM and the tooth root crowning radius Rc. This relation is generated from constraints in machining. The tooth surface crowning is formed at the tooth surface 14a by inserting a machining tool from an outside of the external gear 13. In order to reduce the tooth surface crowning radius Ra (in order to increase the curvature of the tooth surface crowning), the machining tool needs to be deeply inserted at the tooth width direction end position. If a large tooth height (end tooth height he) is not secured at the tooth width direction end position, interference between the tool and the tooth occurs. As described above, the reduction in the tooth root crowning radius Rc is related to the increase in the end tooth height he. As above, because of constraints in machining, the reduction in the tooth root crowning radius Rc is necessary for the reduction in the tooth surface crowning radius Ra. Further, by reducing the tooth root crowning radius Rc and increasing the end tooth height he, the tooth surface crowning radius Ra can be reduced. Thus, the allowable inclination angle δM can be increased without increasing the tooth width.

Figure 10:
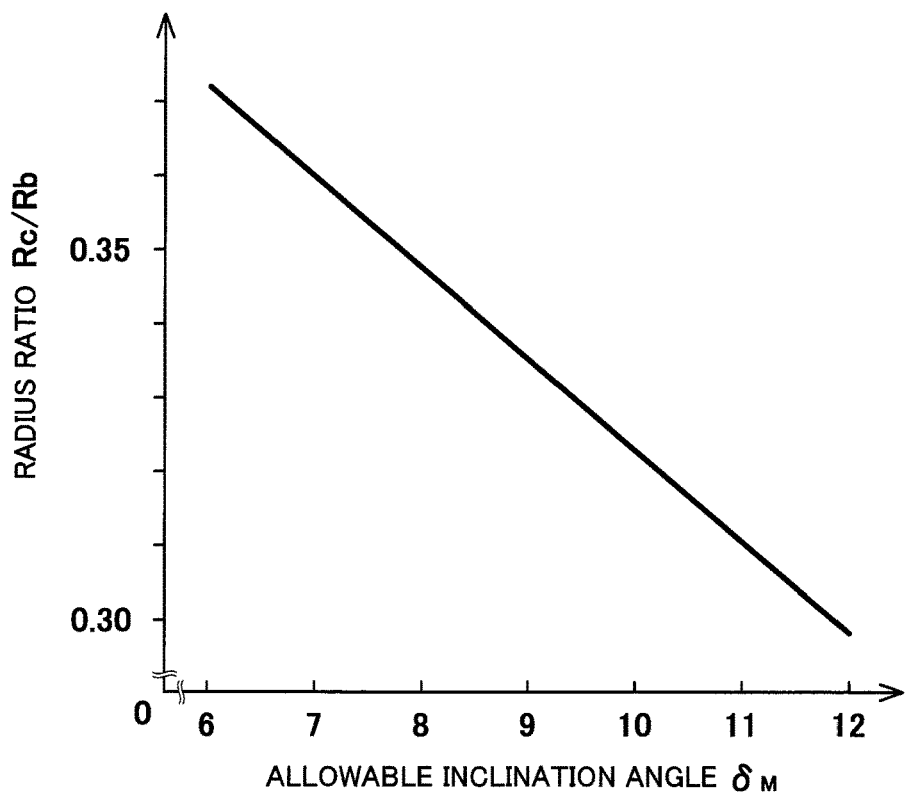
FIG. 10 is a graph showing a relation between the allowable inclination angle δM and a radius ratio Rc/Rb.
Figure 11:
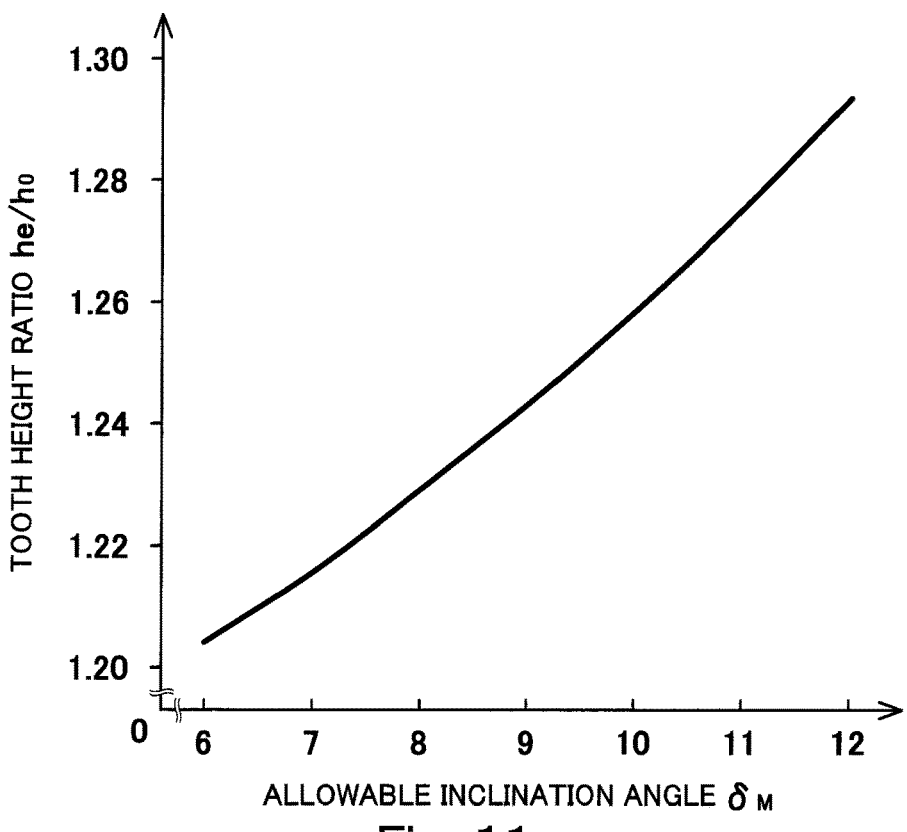
FIG. 11 is a graph showing a relation between the allowable inclination angle δM and a tooth height ratio he/h0.

FIG. 10 is a graph showing a relation between a radius ratio Rc/Rb and the allowable inclination angle δM. FIG. 11 is a graph showing a relation between a tooth height ratio he/h0 and the allowable inclination angle δM. The radius ratio Rc/Rb is a ratio of the tooth root crowning radius Rc to the tooth tip crowning radius Rb. The tooth height ratio he/h0 is a ratio of the end tooth height he to the reference tooth height h0. As shown in FIG. 10, as the radius ratio Rc/Rb decreases, (the reduction in the tooth surface crowning radius Ra can be realized, and) the allowable inclination angle δM increases. As shown in FIG. 11, as the tooth height ratio he/h0 increases, (the reduction in the tooth surface crowning radius Ra by the reduction in the tooth root crowning radius Rc can be realized, and) the allowable inclination angle δM increases.

According to conventional railcar flexible gear couplings, when the tooth width is 24 mm or less, the limit of the allowable inclination angle δM is about 6°.

According to the flexible gear coupling of the present embodiment, the tooth width B is suppressed to 24 mm or less, and in addition, the radius ratio Rc/Rb is set to 0.37 or less. With this, the flexible gear coupling 10 having the allowable inclination angle δM of more than 6° can be provided. The radius ratio Rc/Rb is set to preferably 0.30 to 0.36. With this, the flexible gear coupling 10 having the allowable inclination angle δM of 7° to 12° can be provided.

Further, according to the flexible gear coupling 10 of the present embodiment, the tooth width B is suppressed to 24 mm or less, and in addition, the tooth height ratio he/h0 is set to 1.21 or more. With this, the flexible gear coupling 10 having the allowable inclination angle δM of more than 6° can be provided. The tooth height ratio he/h0 is set to preferably 1.22 to 1.29. With this, the flexible gear coupling 10 having the allowable inclination angle δM of 7° to 12° can be provided. By applying the flexible gear coupling 10 having the allowable inclination angle δM of more than 6° to the railcar bogie, the steering function can be added to the parallel cardan driving bogie, which has not been realized heretofore.

It should be noted that the allowable inclination angle δM can be set to 7° under conditions that: the tooth width B is set to 24 mm; the distance BM from the tooth width direction center to the limit contact portion in the tooth width direction is set to 11 mm; and the tooth surface crowning radius Ra is set to 90 mm. At this time, by setting the tooth root crowning radius Rc to 29 mm, the radius ratio Rc/Rb and the tooth height ratio he/h0 can satisfy the above respective numerical ranges. In addition, the formation of the tooth surface crowning by forming machining can be realized.

It should be noted that the tooth root crowning radius Rc is set to 29 m, i.e., a small value under condition that the tooth width B is set to 24 mm, but the external tooth 14 is formed by the forming machining. By adopting the forming machining, the crowning having a small radius can be formed at the tooth surface 14a without generating an undercut (hollowed part) at the tooth root, unlike generation machining using a hobbing machine. Therefore, both prevention of the decrease in the bending strength of the tooth root (and therefore, the increase in transmitted power) and the increase in the allowable inclination angle δM can be realized. Further, by adopting the forming machining, a cut on a gear material by the tool becomes symmetrical about the tooth width middle. Therefore, the tooth surface 14a is more easily formed line-symmetrically about the tooth width middle than the generation machining. On this account, when the external gear is inclined relative to the internal gear, uniform contact between the external tooth and the internal tooth can be realized at two positions located away from each other by 180°, and vibration noise can be reduced.

Further, the diameter of the tooth tip of the external gear 13 is set to be substantially equal to the diameter of the tooth root of the internal gear 31. Therefore, the misalignment of the hubs 11 and 21 with respect to the sleeve 30 hardly occurs, and therefore, the vibration noise can be reduced.

In the present embodiment, the basic sectional tooth profile is the tooth profile of the involute gear having a larger teeth number than each of the external gear and the internal gear. Therefore, a change in a tooth profile pressure angle in a section of the tooth width end is smaller than a case where the basic sectional tooth profile is a normal involute tooth profile. On this account, abnormal wear and seizure hardly occur, and transmitted power increases.

The foregoing has explained the embodiment, but modifications, deletions, and/or additions may be suitably made with respect to the above configuration within the scope of the present invention.

REFERENCE SIGNS LIST 1 railcar bogie
2 bogie frame
3 wheelset
4 axle
5 wheel
6 traction motor
6a output shaft
7 gear unit
10 flexible gear coupling
13, 23 external gear
31, 32 internal gear
Rb tooth tip crowning radius
Rc tooth root crowning radius
Rc/Rb radius ratio
h0 reference tooth height
he end tooth height
he/h0 tooth height ratio

The invention claimed is:
1. A railcar flexible gear coupling comprising:
two external gears; and
two internal gears meshing with the respective two external gears, wherein:
when viewed from a tooth thickness direction, a tooth tip of each of the external gears is formed in such a circular-arc shape having a tooth tip crowning radius that a distance from a center axis to the tooth tip is longest at a tooth width direction middle, and the distance from the center axis to the tooth tip is shortest at each of both tooth width direction ends;
when viewed from the tooth thickness direction, a tooth root of each of the external gears is formed in such a circular-arc shape having a tooth root crowning radius that a distance from the center axis to the tooth root is longest at the tooth width direction middle, and the distance from the center axis to the tooth root is shortest at each of the tooth width direction ends;
the tooth root crowning radius is smaller than the tooth tip crowning radius;
each of the external gears is formed such that a reference tooth height that is a tooth height at a tooth width direction middle position is smaller than an end tooth height that is a tooth height at a tooth width direction end position; and
a ratio of the end tooth height to the reference tooth height is set to 1.21 or more.

2. The railcar flexible gear coupling according to claim 1, wherein a tooth width of the external gear is 24 mm or less.

3. The railcar flexible gear coupling according to claim 1, wherein each of basic sectional tooth profiles of the external gears and basic sectional tooth profiles of the internal gears is a tooth profile of a hypothetical involute gear, the hypothetical involute gear having a same module as each of the external gears and the internal gears and having a larger teeth number than each of the external gears and the internal gears.

4. The railcar flexible gear coupling according to claim 1, wherein a diameter of the tooth tip of each of the external gears is substantially equal to a diameter of the tooth root of each of the internal gears.

5. A railcar bogie comprising:
a bogie frame supporting a carbody;
a wheelset including an axle and wheels provided at both respective ends of the axle;
a traction motor provided at the bogie frame and including an output shaft extending in parallel with the axle;
a gear unit configured to transmit rotation to the axle; and
the railcar flexible gear coupling according to claim 1, provided between the traction motor and the gear unit.

6. The railcar flexible gear coupling according to claim 1, wherein the ratio of the end tooth height to the reference tooth height is set to 1.22 to 1.29.

7. A railcar flexible gear coupling comprising:
two external gears; and
two internal gears meshing with the respective two external gears, wherein:
when viewed from a tooth thickness direction, a tooth tip of each of the external gears is formed in such a circular-arc shape having a tooth tip crowning radius that a distance from a center axis to the tooth tip is longest at a tooth width direction middle, and the distance from the center axis to the tooth tip is shortest at each of both tooth width direction ends;
when viewed from the tooth thickness direction, a tooth root of each of the external gears is formed in such a circular-arc shape having a tooth root crowning radius that a distance from the center axis to the tooth root is longest at the tooth width direction middle, and the distance from the center axis to the tooth root is shortest at each of the tooth width direction ends;
the tooth root crowning radius is smaller than the tooth tip crowning radius;
a tooth height of the external gear increases in a direction from the tooth width direction middle to each of the tooth width direction ends; and
a ratio Rc/Rb of the tooth root crowning radius to the tooth tip crowning radius is set to 0.37 or less.

8. The railcar flexible gear coupling according to claim 7, wherein the ratio Rc/Rb of the tooth root crowning radius to the tooth tip crowning radius is set to 0.30 to 0.36.

\* \* \* \* \*